United States Patent
Watanabe et al.

(10) Patent No.: US 7,994,748 B2
(45) Date of Patent: Aug. 9, 2011

(54) DRIVE CONTROL SYSTEM OF AN ELECTRIC VEHICLE

(75) Inventors: Kazunori Watanabe, Saitama (JP); Dai Saitoh, Saitama (JP); Hisayoshi Takahashi, Saitama (JP); Kazuo Kotaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 552 days.

(21) Appl. No.: 12/133,201

(22) Filed: Jun. 4, 2008

(65) Prior Publication Data

US 2008/0303465 A1    Dec. 11, 2008

(30) Foreign Application Priority Data

Jun. 6, 2007    (JP) ................................. 2007-150853

(51) Int. Cl.
*H02P 7/00* (2006.01)
(52) U.S. Cl. .................. 318/432; 318/139; 318/434
(58) Field of Classification Search .................. 318/139, 318/432, 434
See application file for complete search history.

(56) References Cited

U.S. PATENT DOCUMENTS

| | | | |
|---|---|---|---|
| 6,321,865 B1 * | 11/2001 | Kuribayashi et al. | 180/243 |
| 2008/0315813 A1 * | 12/2008 | Yamada et al. | 318/432 |

FOREIGN PATENT DOCUMENTS

| | | | |
|---|---|---|---|
| JP | 02-299402 A | | 12/1990 |
| JP | 03027702 A | * | 2/1991 |
| JP | 2674828 B2 | | 7/1997 |

* cited by examiner

*Primary Examiner* — Walter Benson
*Assistant Examiner* — Kawing Chan
(74) *Attorney, Agent, or Firm* — Arent Fox, LLP (57) ABSTRACT

The object of the present invention is provide a drive control system of an electric vehicle that can prevent overshoot of the amount of slip. The drive control system of the electric vehicle includes: a motor to drive a driving wheel; a PDU; a number-of-revolution sensor that detects the number of revolutions of the motor; a grip number of revolutions calculating device for calculating the current grip number of revolutions of the motor; a motor power limiting value calculating portion and a conversion portion that determines the limiting torque value of the motor; and a driving torque determining portion that determines the driving torque of the motor.

7 Claims, 6 Drawing Sheets

FIG. 6

DRIVE CONTROL SYSTEM OF AN ELECTRIC VEHICLE

CROSS-REFERENCE TO RELATED APPLICATION

This application is based on and claims the benefit of priority from Japanese Patent Application No. 2007-150853, filed on 6 Jun. 2007, the content of which is incorporated herein by reference.

BACKGROUND OF THE INVENTION

1. Field of the Invention

This invention relates to a drive control system of an electric vehicle. More particularly, it relates to the drive control system of the electric vehicle that controls wheel slip by limiting the power to the motor.

2. Related Art

In a vehicle that runs by generating torque at the driving wheels, when a driving torque supplied to the driving wheels becomes larger than friction generated between the driving wheels and a road surface, the driving wheels start to turn without gripping, which indicates that slip has occurred, and controllability decreases considerably. Such slip of the driving wheels tends to occur especially when driving on frozen or wet road surfaces on which the friction is low, or when accelerating the vehicle by supplying excessive torque to the driving wheels.

Then, for example, in the Japanese Patent No. 2674828, an electric vehicle is disclosed in which the slip is detected electronically, and if the slip is judged to occur, the motor current is decreased to decrease the driving torque and thus the slip is prevented.

More specifically, this electric vehicle detects the number of revolutions of the motor, and calculates acceleration with this number of revolutions. On the other hand, a motor current is detected, and an expected acceleration with the number of revolutions of the motor is calculated based on this motor current that will not generate the slip between the driving wheels and the road surface. Furthermore, when acceleration with the number of revolutions of the motor exceeds the expected acceleration, it is judged that the slip is generated. When it is judged that the slip is generated, the driving torque of the motor is decreased and thus the slip is suppressed.

However, in the electric vehicle described above, when the driving torque of the motor is decreased by making the feedback of the number of revolutions of the motor or the current, by considering the delay of the motor response, it takes a certain time from the occurrence of the slip to the elimination of the slip by decreasing the torque created at the driving wheels. That is, the amount of slip at the driving wheels overshoots and hence there is a risk of decreased the controllability.

SUMMARY OF THE INVENTION

The object of the present invention is to provide an operation control system of an electric vehicle that can prevent overshoot of the amount of slip.

The driving control system of an electric vehicle of the present invention is characterized in that it includes: a motor (for example, the motor 20 described later) that drives a driving wheel; a motor driving means (for example, PDU 30 described later) for generating torque on the motor dependent on a determined driving torque by supplying power to the motor; a number of revolutions detection means (for example, the number-of-revolution sensor 21 as described later) for detecting a number of revolutions of the motor; a grip number of revolutions calculating means (for example, a grip number of revolutions calculating portion 52) for calculating a current grip number of revolutions of the motor based on a number of revolutions stored before a predetermined time, in which the grip number of revolutions is defined as the number of revolutions of the motor in case where the driving wheel is driven with grip during a predetermined time and the number of revolutions of the motor before the predetermined time is stored; a limiting torque determining means (for example, the motor power limiting value calculating portion 53 and the conversion portion 57) for determining a limiting torque of the motor based on a smaller number of revolutions that is determined by a comparison of a current number of revolutions detected by the number of revolutions detection means and the current grip number of revolutions calculated by the the grip number of revolutions calculating means; and a driving torque determining means (for example a driving torque determining portion 56) for determining a driving torque value of the motor based on the limiting torque value and outputting to the motor driving means.

According to the present invention, the limiting torque value is determined based on the smaller number of revolutions determined by the comparison between the current number of revolutions of the motor that is detected by the number of revolutions detection means and the grip number of revolutions that is calculated by assuming driving with grip. That is, when the driving wheels slip and the number of revolutions of the motor exceeds the grip number of revolutions, as the limiting torque value is determined by the grip number of revolutions, the slip caused by the excessive increase in the torque generated at the driving wheels is prevented. Especially here, as the grip number of revolutions is determined, by considering the motor response delay and based on the number of revolutions of the motor a predetermined time before the current time, the amount of slip overshoot is prevented.

In this case, it is preferable that the grip number of revolutions calculating means creates a control map showing a relation between the number of revolutions of the motor and an amount of increase in the grip number of revolutions of the motor after the predetermined time elapses, based on a map (for example, the map shown in FIG. 5 as described later), showing a relation between the elapsed time and the amount of increase in the number of revolutions of the motor in case where driving with grip is performed on a dry road surface and with maximum acceleration, includes a memory means (for example, a memory portion 54 as described later) for storing the control map (for example, the map shown in FIG. 6 as described later) and calculates the current grip number of revolutions based on the control map.

According to the present invention, the current grip number of revolutions is calculated under the assumption that the driving with grip is performed on a dry road surface with maximum acceleration. With this means, the slip is prevented effectively without excessively limiting the motor driving torque.

In this case, it is preferable that the grip number of revolutions calculating means calculates the current grip number of revolutions by adding the amount of increase in the grip number of revolutions after the predetermined time to the number of revolutions of the motor before the predetermined time.

According to the present invention, the current grip number of revolutions is calculated by adding the amount of increase in the grip number of revolutions after the time unit to the number of revolutions of the motor before the time unit. As a result of this, the overshoot of the amount of slip is effectively prevented.

In this case, it is preferable that it further includes a command torque calculating means (for example, a command torque calculating portion 40 as described later) for calculating a command torque value of the motor based on at least an accelerator position, the limiting torque determining means includes: a motor power limiting value calculating means (for example, the motor power limiting value calculating portion 53 as described later) for calculating a motor power limiting value based on the smaller number of revolutions of the current number of revolutions of the motor and the current grip number of revolutions, and a command torque value that is calculated by the command torque value calculating means; and a limiting torque value calculating means (for example, conversion portion 57 as described after) for calculating the limiting torque value based on the motor power limiting value that is calculated by the motor power limiting value calculating means and the current number of revolutions of the motor.

According to the present invention, the motor power limiting value is calculated by the motor power limiting value calculating means, and based on this motor power limiting value and the current number of revolutions of the motor, the limiting torque value is calculated by the limiting torque value calculating means. According to this, the limiting torque value can be calculated exactly.

In this case, it is preferable that the driving torque determining means compares the command torque value and the limiting torque value, and determines the smaller torque value to be the driving torque value of the motor.

According to the present invention, when the command torque value exceeds the limiting torque value, the driving torque value of the motor is determined based on the limiting torque value. That means that the command torque value is limited. Therefore, the occurrence of slip is effectively prevented.

In this case, it is preferable that the limiting torque determining means determines a larger limiting torque value according to the increase in the number of revolutions of the motor.

According to the present invention, the larger the number of revolutions of the motor becomes, the larger the limiting torque value is determined. In other words, according to the increase in the number of revolutions of the motor, the limitation of the torque that is generated in the motor is relaxed. Therefore, especially at high speed driving conditions, the degradation in controllability by the limitation of the torque against the will of the driver is prevented.

In this case, it is preferable that it includes a command torque calculating means for calculating a command torque value of the motor based on the at least an accelerator position, in which the limiting torque determining means includes; a motor power limiting value calculating means for calculating a motor power limiting value based on a smaller number of revolutions of the current number of revolutions of the motor and the current grip number of revolutions, and the command torque value that is calculated by the command torque calculating means; and a limiting torque value calculating means for calculating the limiting torque value based on the motor power limiting value that is calculated by the motor power limiting value calculating means and the current number of revolutions of the motor, in which the motor power limiting value calculating means calculates the motor power limiting value which is a sum of a term that is the command torque value multiplied by the smaller number of revolutions and a power offset value that is substantially proportional to the smaller number of revolutions.

According to the present invention, the slip occurrence by the excessive increase in torque that is generated at the driving wheel can be prevented. In addition, the overshoot of the amount of slip can be prevented.

DETAILED DESCRIPTION OF THE INVENTION

Hereinafter, an embodiment of the present invention is described referring to the figures.

Figure 1:
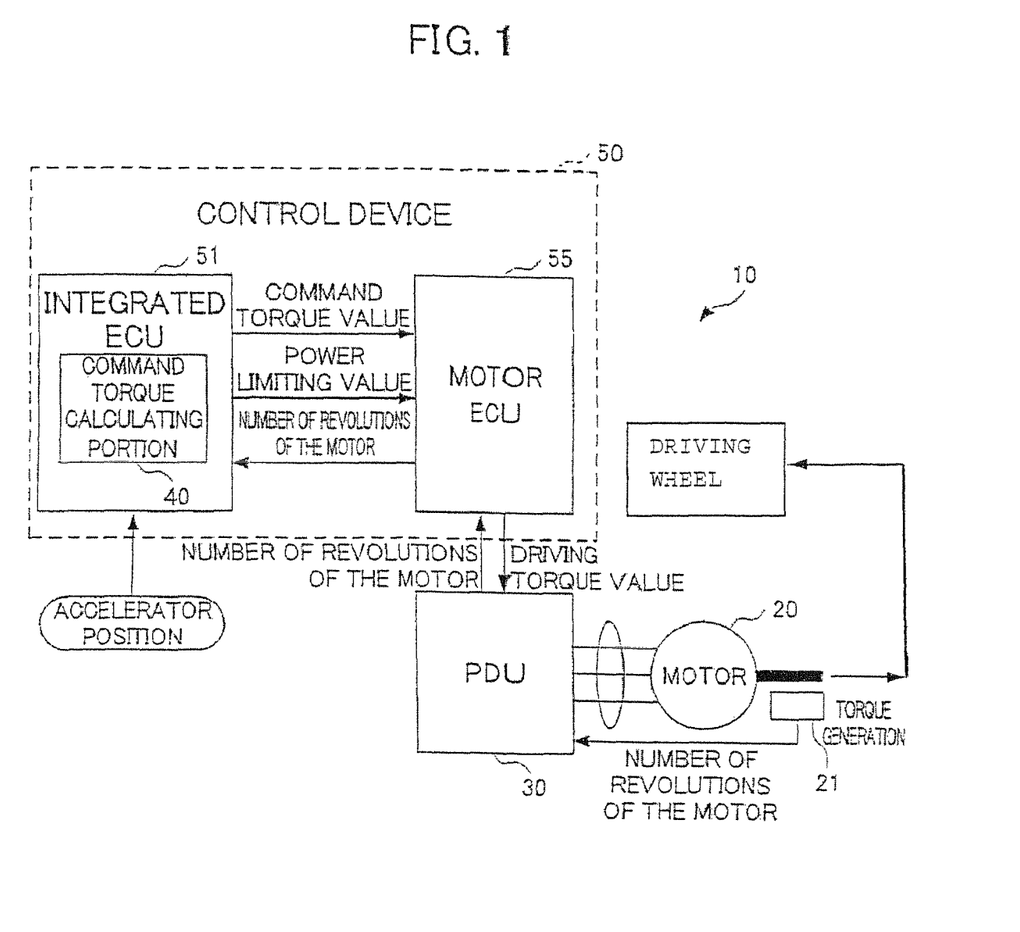
FIG. 1 is a block diagram showing a configuration of a drive control system of the electric vehicle related to an embodiment of the present invention.

FIG. 1 is a block diagram showing a configuration of a drive control system 10 of an electric vehicle related to an embodiment of the present invention.

The drive control system 10 includes a motor 20, a PDU (Power Drive Unit) 30 as a motor driving means, and a control device 50 as a control means and is mounted, for example, on the electric vehicle that includes a plurality of driving wheels.

The motor 20, for example, is configured of a 3-phase AC synchronous motor and is controlled by 3-phase AC power supplied by PDU 30. The driving wheels of the electric vehicle are mechanically connected to an output shaft of this motor 20, and the driving wheels that are connected to the output shaft are rotationally driven. In addition, a number-of-revolution sensor 21 is provided to the output shaft of this motor 20 as a number of revolutions detection means for detecting the number of revolutions of the motor 20 (motor number of revolutions). The number of revolutions of the motor that is detected by this number-of-revolution sensor 21 is input to a control device 50 via PDU 30.

The PDU 30 includes a PWM inverter using pulse width modulation (PWM) and controls the driving operation and regenerative operation of the motor 20 in response to a control command output from a control device 50. For example, during the driving period of the motor 20, the PDU 30 supplies 3-phase AC power to the motor 20 dependent on a driving torque value that is input from the control device 50, and generates the torque at the motor 20 dependent on this driving torque value. In addition, for example, during the regeneration period of the motor 20, the PDU 30 converts the 3-phase AC power that is output from the motor 20 to DC power, and charges the battery that is not shown in the figure.

The control device 50 inputs an accelerator position, as described later, and the number of revolutions of the motor that is detected by the number-of-revolution sensor 21, determines the driving torque value by giving feedback of the number of revolutions of the motor that is detected by the number-of-revolution sensor 21 to a command torque value that is calculated by a command torque calculating portion 40, and outputs this driving torque value to PDU 30. This control device 50 includes an integrated ECU 51 for controlling the entire system and a motor ECU 55 for controlling the motor 20 by outputting the control command to the PDU 30 in response to the control signal that is output from the integrated ECU 51.

The integrated ECU 51 calculates a power limiting value based on inputs of the command torque value that is calculated by the command torque calculating portion 40, and the number of revolutions of the motor that is detected by the number-of-revolution sensor 21, and outputs this power limiting value to the motor ECU 55. Here, this power limiting value indicates an upper limit value of the power that is supplied to the motor 20. That means that this power limiting value is also a limiting value of torque that is generated by the motor 20.

The motor ECU 55 determines a driving torque value based on the command torque value and the power limiting value that is input from the integrated ECU 51, and outputs this driving torque value to the PDU 30.

The integrated ECU 51 and the motor ECU 55 are configured as a microprocessor including a CPU and also includes a ROM that stores a processing program, a RAM that temporarily stores data and input/output ports.

Figure 2:
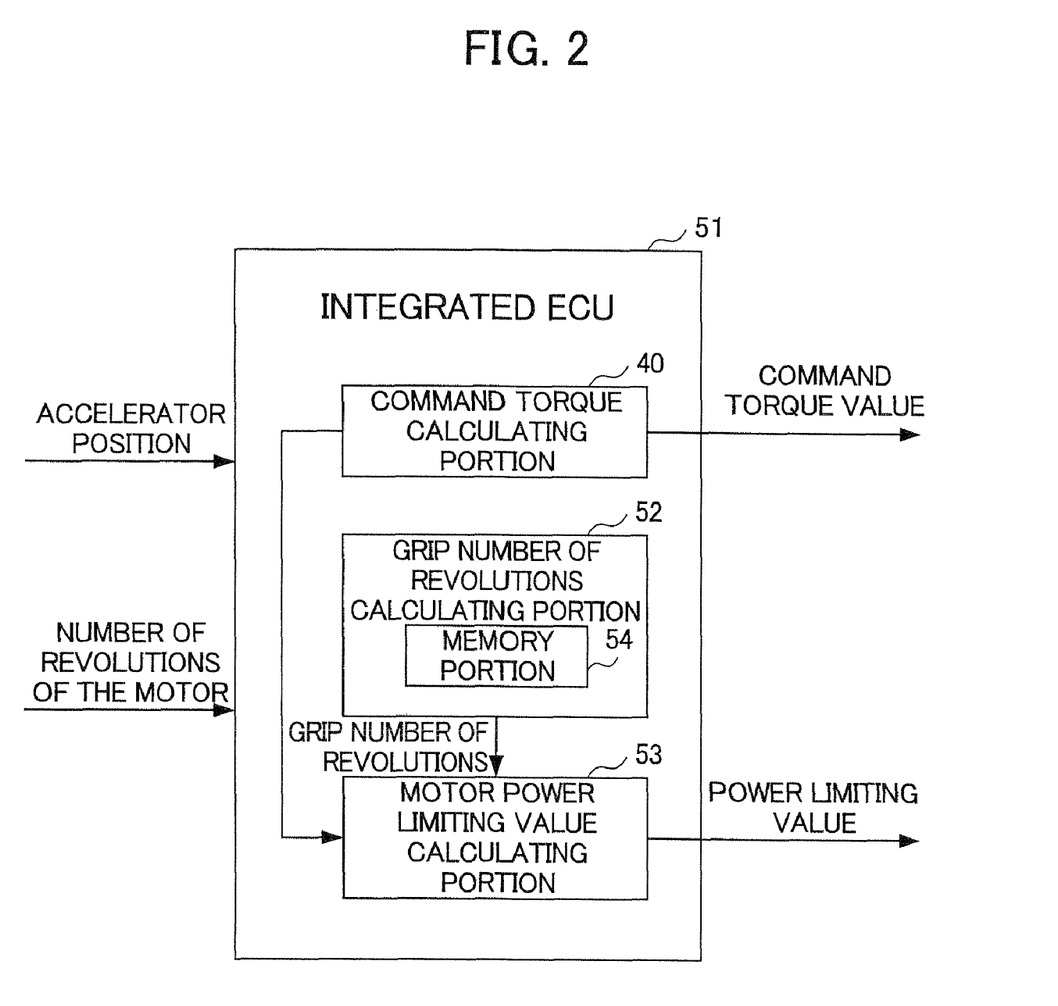
FIG. 2 is the block diagram showing a configuration of an integrated ECU related to the embodiment.

FIG. 2 is a block diagram showing a configuration of the integrated ECU 51.

The integrated ECU 51 includes the command torque calculating portion 40, a grip number of revolutions calculating portion 52 and a motor power limiting calculating portion 53.

The command torque calculating portion 40 is connected to the accelerator position sensor that detects the degree by which the accelerator is operable by the driver, and based on the accelerator position that is detected by this accelerator position sensor and the number of revolutions of the motor that is detected by the number-of-revolutions-sensor 21, calculates the command torque value of the motor 20, and outputs this command torque value to the motor power limiting value calculating portion 53 and the motor ECU 55.

The grip number of revolutions calculating portion 52 stores the number of revolutions of the motor 20 at a predetermined time before the current time and, based on the number of revolutions at the predetermined time before the current time, calculates the current grip number of revolutions of the motor 20, and outputs this current grip number of revolutions to the motor power limiting value calculating portion 53. Here, the grip number of revolutions indicates the number of revolutions of the motor 20, in a case where the driving wheels of the electric vehicle are driven with grip on a dry road surface during the predetermined time with maximum acceleration. In addition, in the present embodiment of the invention, the predetermined time is assumed to be 10 ms, but it is not limited to this value.

In other words, this grip number of revolutions calculating portion 52 assumes to perform the driving with grip on a dry road surface with maximum acceleration at the predetermined time before the current time, and calculates the grip number of revolutions under this assumption. In addition, this grip number of revolutions calculating portion 52 includes a memory portion 54 that stores a control map described later in FIG. 6, and calculates the current grip number of revolutions based on this control map.

The motor power limiting value calculating portion 53 compares the current number of revolutions of the motor that is detected by the number-of-revolution sensor 21 with the current grip number of revolutions that is calculated by the grip number of revolutions calculating portion 52. In addition, the motor power limiting value calculating portion 53 calculates the power limiting value based on the smaller number of revolutions obtained by this comparison and the command torque value that is calculated by the command torque calculating portion 40, and outputs this power limiting value to the motor ECU 55.

Figure 3:
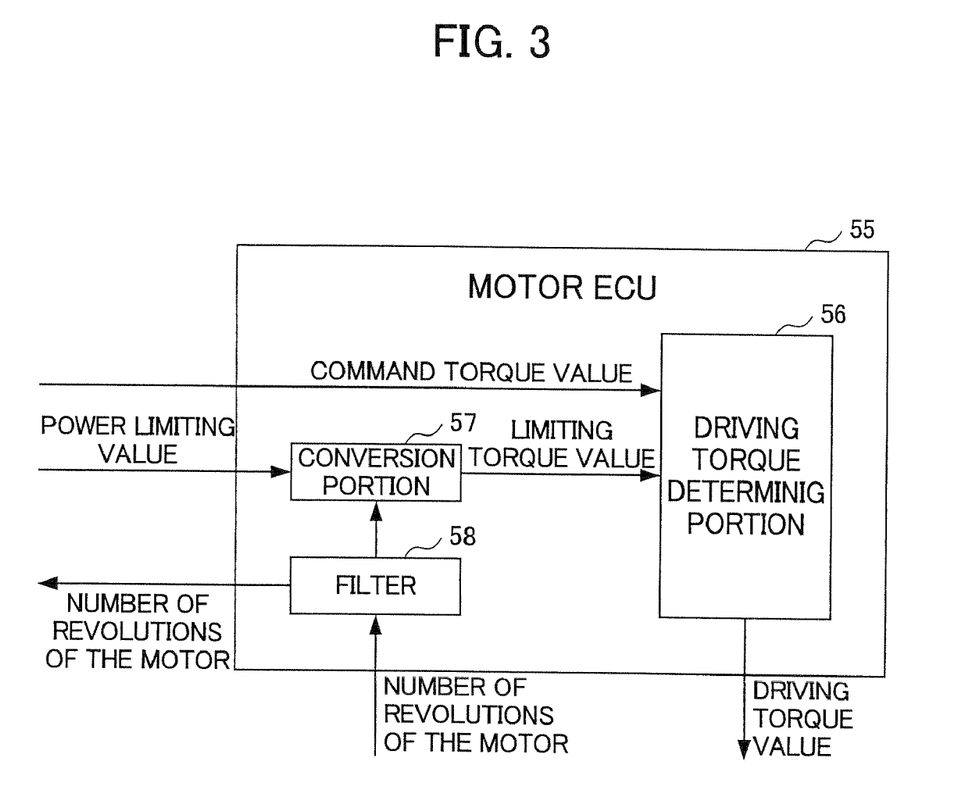
FIG. 3 is a block diagram showing a configuration of a motor ECU related to the embodiment.

Next, the configuration of the motor ECU 55 is described referring to FIG. 3.

The motor ECU 55 includes a driving torque determining portion 56 as a driving torque determining means, a conversion portion 57 as a limiting torque value calculating means and a filter 58.

The conversion portion 57 calculates a limiting torque value based on the power limiting value that is calculated by the motor power limiting value calculating portion 53 in the integrated ECU 51 and the number of revolutions of the motor that is detected by the number-of-revolution sensor 21, and outputs this limiting torque value to the driving torque determining portion 56. More specifically, this conversion portion 57 converts the power limiting value to the corresponding limiting torque value by dividing the power limiting value by the number of revolutions of the motor and multiplying the result by a predetermined coefficient.

The driving torque determining portion 56 compares the limiting torque value that is input from the conversion portion 57 with the command torque value that is input from the command torque calculating portion 40, and determines the smaller torque value as the driving torque value of the motor 20 and outputs this driving torque to the PDU 30.

The filter 58 removes noise that is included in signals, and the signal that is output from the number-of-revolution sensor 21 is input to the conversion portion 57 and the integrated ECU 51 via this filter 58.

Figure 4:
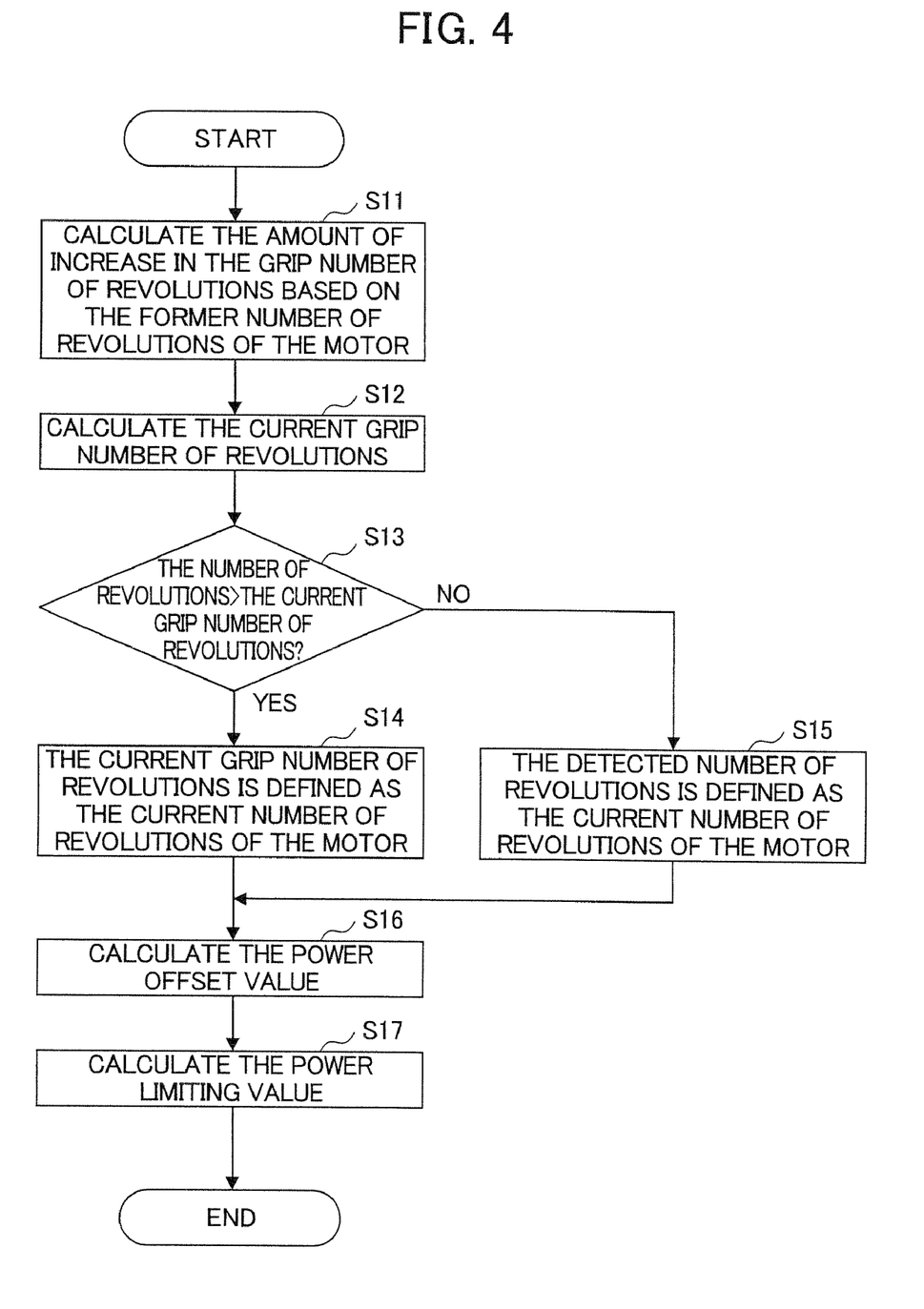
FIG. 4 is a flow chart showing an operation of the integrated ECU related to the embodiment.

Next, the operation of the integrated ECU 51 is described referring to a flow chart of FIG. 4.

FIG. 4 is the flow chart showing the process to calculate the power limiting value in the integrated ECU 51. This process to calculate the power limiting value is performed every predetermined time.

In Step S11, the amount of increase in the grip number of revolutions is calculated based on the former number of revolutions of the motor, and advances to Step S12. Here, the former number of revolutions of the motor indicates the number of revolutions of the motor that is calculated in the former process and, as is shown later in Steps S14 and S15, the number of revolutions of the motor 20 before the predetermined time or the grip number of revolutions before the predetermined time is saved.

Figure 5:
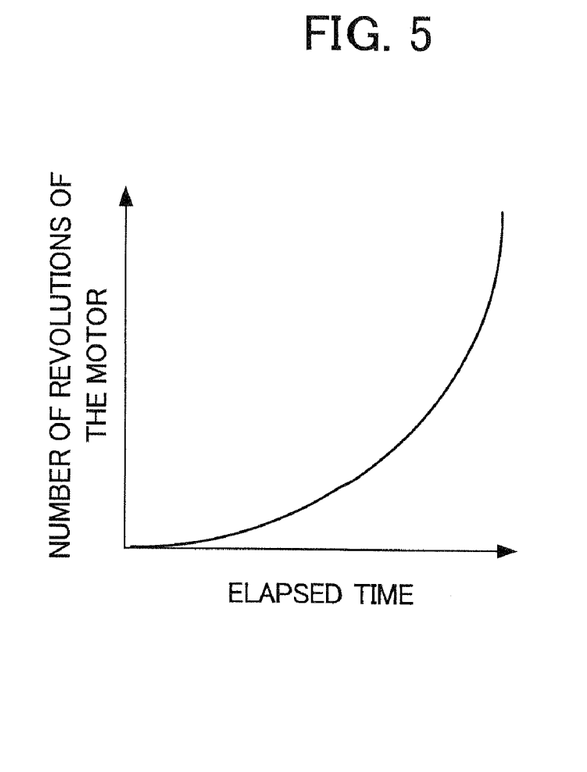
FIG. 5 is a figure showing a relation of an amount of increased in the number of revolutions of the motor versus the elapsed time when driving with grip is performed on a dry road surface with maximum acceleration related to the embodiment.
Figure 6:
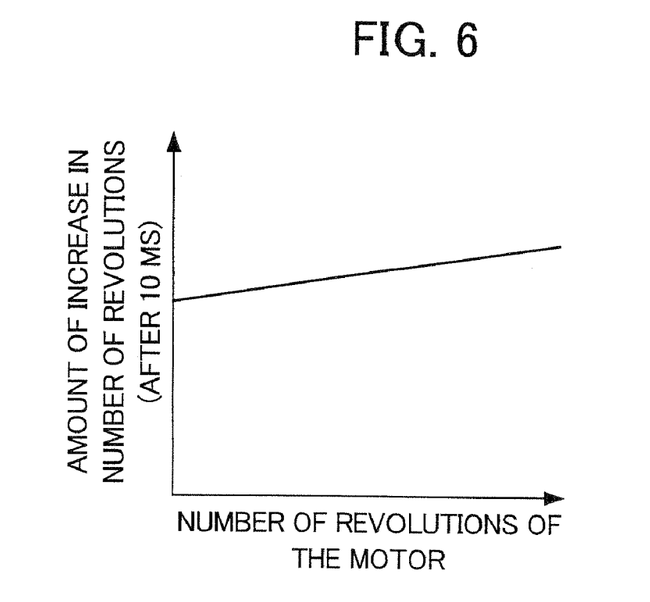
FIG. 6 is a figure showing a relation of the increased number of revolutions versus the number of revolutions of the motor related to the embodiment.

FIG. 5 shows a relation of the increased amount of the number of revolutions of the motor versus elapsed time when the driving with grip is performed on a dry road surface with maximum acceleration. FIG. 6 shows a relation of the increased number of revolutions versus the number of revolutions of the motor that is created based on the map shown in FIG. 5, and here the increased number of revolutions is defined as the amount of increase in the grip number of revolutions after the predetermined time (10 ms) elapses. As is shown in FIG. 6, the increased number of revolutions increases roughly proportionally to the number of revolutions of the motor. In addition, this map shown in FIG. 6 is stored in the memory portion 54 as the control map. In Step S11, the increased number of revolutions is calculated dependent on the former number of revolutions of the motor referring to the control map shown in FIG. 6.

In Step S12, the current grip number of revolutions is calculated, and advances to Step S13. In this step, the current grip number of revolutions is calculated by adding the amount of increase in the grip number of revolutions that is determined in Step S11 to the former number of revolutions of the motor.

In Step S13, it is judged whether the number of revolutions of the motor that is detected by the number-of-revolution sensor 21 is larger than the current grip number of revolutions, and in a case where it is YES, the process advances to Step S14, and in a case where it is NO, advances to Step S15.

In Step S14, the current grip number of revolutions is defined as the current number of revolutions of the motor, and the process advances to Step S16.

In Step S15, the number of revolutions that is detected by the number-of-revolution sensor 21 is defined as the current number of revolutions of the motor, and the process advances to Step S16.

In Step S16, the power offset value is calculated, and the process advances to Step S17. This power offset value is added during the calculation of the power limiting value in Step S17, and it compensates the power limiting value dependent on the current number of revolutions of the motor.

Figure 7:
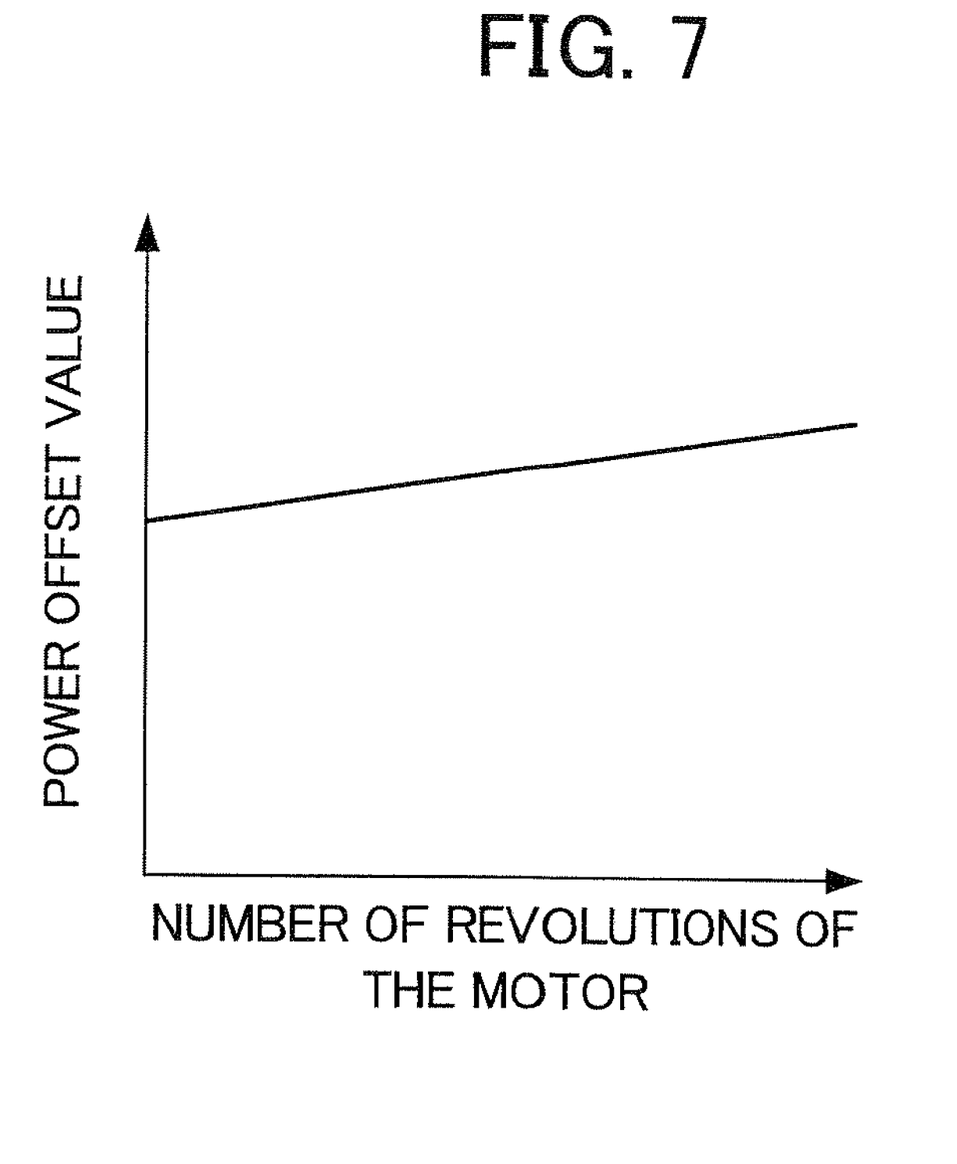
FIG. 7 is a figure showing a control map for compensation related to the embodiment.

FIG. 7 is a figure showing a relation between the number of revolutions of the motor and the power offset value. As is shown in FIG. 7, the power offset value increases roughly proportionally to the number of revolutions. In Step S16, by using the control map as shown in FIG. 7, the power offset value is calculated dependent on the current number of revolutions of the motor.

In Step S17, the power limiting value is calculated based on the command torque value, the current number of revolutions of the motor, and the power offset value, and then the processing is completed. More specifically, as is shown in the following equation, the power limiting value is calculated based on the addition of a term of the command torque value multiplied by the current number of revolutions of the motor and the power offset value.

> The power limiting value=the command torque value×
> the current number of revolutions of the motor×
> constant+the power offset value.

Here in particular, the power limiting value is determined as the larger value according to the increase in the current number of revolutions of the motor by adding the power offset value that is roughly proportional to the current number of revolutions of the motor. In other words, the power limitation of the motor 20 is relaxed according to the increase in the number of revolutions of the motor 20.

According to the drive control system 10 of the electric vehicle of the embodiment, there are the following effects.

(1) The limiting torque value is determined based on the smaller number of revolutions after comparison between the number of revolutions of the motor 20 that is detected by the number-of-revolution sensor 21 and the grip number of revolutions that is calculated assuming the driving with grip. That is, the limiting torque value is determined by the grip number of revolutions when the number of revolutions of the motor 20 exceeds the grip number of revolutions by the slip of the driving wheels so that the slip, caused by the excessive increase in the torque that is generated at the driving wheel, is prevented. Here in particular, as the grip number of revolutions is determined, by considering the response delay of the motor 20 and based on the number of revolutions of the motor 20 the predetermined time before the current time, the overshoot of the amount of slip can be prevented.

(2) The current grip number of revolutions is calculated under the assumption of performing driving with grip on a dry road surface with maximum acceleration. Therefore, the slip is prevented effectively without excessively limiting the driving torque of the motor 20.

(3) The current grip number of revolutions is calculated by adding the amount of increase in the grip number of revolutions after the unit time to the number of revolutions of the motor 20 before the unit time. As a result of this, the overshoot of the amount of slip is effectively prevented.

(4) The motor power limiting value is calculated by the motor power limiting value calculating portion 53, and based on this motor power limiting value and the current number of revolutions of the motor 20, the limiting torque value is calculated by the conversion portion 57. According to this, the limiting torque value can be exactly calculated.

(5) When the command torque value exceeds the limiting torque value, the driving torque value of the motor 20 is determined based on the limiting torque value. That indicates that the command torque value is limited. Therefore, the occurrence of the slip is prevented more effectively.

(6) The larger the number of revolutions of the motor 20, the larger the limiting torque value that is determined becomes. In other words, according to the increase in the number of revolutions of the motor 20, the limitation of the torque that is generated in the motor 20 is relaxed. Therefore, especially under high speed running conditions, a degradation in controllability by limiting the torque against the will of the driver is prevented.

Furthermore, the present invention is not limited to the above described embodiments and modifications and improvements within the scope to achieve the object of the present invention are included.

In the above embodiments, the command torque is calculated based on the accelerator position and the number of revolutions of the motor, but it is not limited thereto. The VSA ECU (driving stability control unit) that performs the control to keep the driving stability of the electric vehicle may be connected to the integrated ECU, and the command torque value may be calculated by cooperation with the VSA ECU.

What is claimed is:

1. A drive control system of an electric vehicle, comprising:

a motor that drives a driving wheel;

a motor driving means for generating torque on the motor dependent on a determined driving torque value by supplying power to the motor;

a number of revolutions detection means for detecting a number of revolutions of the motor;

a grip number of revolutions calculating means for calculating a current grip number of revolutions of the motor based on a number of revolutions stored before a predetermined time, wherein the grip number of revolutions is defined as the number of revolutions of the motor in case where the driving wheel is driven with grip during a predetermined time, and the number of revolutions of the motor before the predetermined time is stored;

a limiting torque determining means for determining a limiting torque value of the motor based on a smaller number of revolutions that is determined by a comparison of a current number of revolutions detected by the number of revolutions detection means and the current grip number of revolutions calculated by the grip number of revolutions calculating means; and a driving torque determining means for determining a driving torque value of the motor based on the limiting torque value and outputting to the motor driving means.

2. The drive control system of the electric vehicle according to claim 1, wherein
the grip number of revolutions calculating means creates a control map showing a relation between the number of revolutions of the motor and an amount of increase in the grip number of revolutions of the motor after the predetermined time elapses, based on a map showing a relation between the elapsed time and the amount of increase in the number of revolutions of the motor in case where driving with grip is performed on a dry road surface with maximum acceleration, comprises a memory means for storing the control map, and calculates the current grip number of revolutions based on the control map.

3. The drive control system of the electric vehicle according to claim 2, wherein
the grip number of revolutions calculating means calculates the current grip number of revolutions by adding the amount of increase in the grip number of revolutions after the predetermined time to the number of revolutions of the motor before the predetermined time.

4. The drive control system of the electric vehicle according to claim 1, further comprising: a command torque calculating means for calculating a command torque value of the motor based on at least an accelerator position,
the limiting torque determining means comprises;
a motor power limiting value calculating means for calculating a motor power limiting value based on the smaller number of revolutions of the current number of revolutions of the motor and the current grip number of revolutions, and the command torque value that is calculated by the command torque calculating means; and
a limiting torque value calculating means for calculating the limiting torque value based on the motor power limiting value that is calculated by the motor power limiting value calculating means and the current number of revolutions of the motor.

5. The drive control system of the electric vehicle according to claim 4, wherein
the driving torque determining means compares the command torque value and the limiting torque value, and determines the smaller torque value to be the driving torque value of the motor.

6. The drive control system of the electric vehicle according to claim 1, wherein
the limiting torque determining means determines a larger limiting torque value according to the increase in the number of revolutions of the motor.

7. The drive control system of the electric vehicle according to claim 6 further comprising: a command torque calculating means for calculating a command torque value of the motor based on at least an accelerator position, wherein
the limiting torque determining means comprises;
a motor power limiting value calculating means for calculating a motor power limiting value based on a smaller number of revolutions of the current number of revolutions of the motor and the current grip number of revolutions, and the command torque value that is calculated by the command torque calculating means; and
a limiting torque value calculating means for calculating the limiting torque value based on the motor power limiting value that is calculated by the motor power limiting value calculating means and the current number of revolutions of the motor,
and wherein the motor power limiting value calculating means calculates the motor power limiting value which is a sum of a term that is the command torque value multiplied by the smaller number of revolutions and a power offset value that is substantially proportional to the smaller number of revolutions.

* * * * *